United States Patent [19]
Gray et al.

[11] Patent Number: 5,240,507
[45] Date of Patent: Aug. 31, 1993

[54] CLEANING METHOD AND SYSTEM

[76] Inventors: Donald J. Gray, 9 McGraw Ct., East Greenwich, R.I. 02818; Peter T. E. Gebhard, 335 Valley St., Providence, R.I. 02908

[21] Appl. No.: 787,935

[22] Filed: Nov. 5, 1991

[51] Int. Cl.⁵ .......................... B08B 3/10; B08B 5/04
[52] U.S. Cl. ......................................... 134/21; 134/11
[58] Field of Search .............................. 134/21, 11

[56] References Cited
U.S. PATENT DOCUMENTS

| | | | |
|---|---|---|---|
| 4,303,454 | 12/1981 | Petterson et al. | 134/11 |
| 5,045,117 | 9/1991 | Witherell | 134/21 |
| 5,115,576 | 5/1992 | Roberson, Jr. et al. | 134/21 |

*Primary Examiner*—Theodore Morris
*Assistant Examiner*—Zeinab El-Arini
*Attorney, Agent, or Firm*—Iandiorio & Dingman

[57] ABSTRACT

A closed circuit solvent cleaning method and system in which the object to be cleaned is placed in a chamber and subjected to a negative gauge pressure to remove air and other non-condensible gases, after which a solvent is introduced to the evacuated chamber and the object is cleaned. Following this, the solvent is recovered from the object and chamber and then the clean object is removed.

20 Claims, 2 Drawing Sheets

CLEANING METHOD AND SYSTEM

FIELD OF INVENTION

This invention relates to an improved cleaning method and system, and more particularly to a closed solvent cleaning method and system which virtually eliminates the mixture of the solvent with air throughout the cleaning operation. Eliminating air from the process allows complete recovery of the vapors by conventional condensing method, thereby controlling emissions to ambience surroundings.

BACKGROUND OF INVENTION

Cleaning operations are becoming more and more of a burden on industry because of the ever-stricter requirements being made on the environmental disposition of compounds used in the cleaning operations and resulting effluents. Cleaning operations affected include those involving clothing, rugs and furnishings, as well as those of a more industrial nature such as involving the cleaning and degreasing of metals, ceramics, plastics and other materials. Solvent cleaning processes, those using a solvent to degrease and clean, are the most prevalent. There are two types of solvent cleaning processes: open and closed. Open systems are still the most commonly used, but their appeal is shrinking with increasing demands of environmental safety. Open systems include such approaches as solvent vapor degreasing, solvent ultrasonic cleaning, cold or hot solvent dipped and solvent spray systems. These systems suffer from a number of shortcomings, among the most important of which are the contamination of the environment and the cost of constantly replenishing the non-recoverable solvent. In addition, the cost of equipment to contain the vapor and to properly dispose of the vapor and liquid waste is becoming more and more formidable.

The closed systems, so-called, attempt to combat these problems but with indifferent success. The loss of solvent as vapor and liquid still occurs even in a so-called closed system because the vapor escapes when the cleaned parts are removed and the parts carry off solvent which clings to their surfaces and resides in the pores of the material. Further, attempts to recover the solvent are expensive and less than totally successful. For even though the system is "closed" when the solvent is introduced to the closed chamber, it mixes with the air there. After the cleaning operation the solvent in liquid form can be easily separated from the air, but not so with solvent in vapor form. That requires a major effort. Even if the air and solvent are condensed, only a small amount of solvent can be recovered. Incineration is one technique for getting rid of solvent but that requires significant investment in special equipment, extra heat energy and it loses the solvent, which must then be replenished. Steam stripping is a technique which actually recovers the solvent, but it too requires special equipment and heat energy to make the steam. In addition, the steam must be condensed to water and then separated from the solvent.

Thus, conventional cleaning systems have problems in the area of hazardous emissions and solvent recovery. They are generally limited to operating at specific temperatures and pressures. They typically do not dry all the solvent off the objects before exposing them to the atmosphere. They utilize heat energy during a substantial part, if not all, of the cleaning cycle. Conventional systems also need a great deal of solvent to fill their cleaning tanks and require additional energy input to pump the solvent through the system. In addition, standard solvent vapor cleaning systems must use solvents whose vapors are heavier than air. These vapors are confined in a blanket over the boiling solvent by using expensive refrigerator coils and by limiting the dimensions of the system tank. These systems operate at fixed temperatures which are determined by the boiling point of the solvent at atmospheric pressure.

A different approach, known as vacuum degreasing, avoids some of the problems of solvent cleaning. In this approach the contaminants are exposed to a high temperature, low-pressure environment in order to reach pressures below the vapor pressure of the contaminant. Essentially the contaminant is boiled off the parts. The problem here, however, is that the contaminants generally have a very low vapor pressure. Consequently, extremely high vacuums and/or temperatures are required. Although solvents are not emitted, the contaminant often is emitted which itself can become a problem. The process is generally costly due to the sub torr pressures and high temperatures required. In many cases non-volatile residue, either present in the contaminant originally (i.e., sulfur residue) or resulting from a breakdown of the contaminant due to the high temperature requirements (carbon deposits) are often left behind on the parts. The pollution abatement energy costs and cleaning efficiency requirements strongly limit the applications of such a system.

SUMMARY OF INVENTION

It is therefore an object of this invention to provide an improved closed circuit solvent cleaning method and system.

It is a further object of this invention to provide such an improved closed circuit solvent cleaning method and system which employs the solvent in either vapor or liquid form or both.

It is a further object of this invention provide such an improved closed circuit solvent cleaning method and system which enables solvent recovery and limits hazardous emissions.

It is a further object of this invention provide such an improved closed circuit solvent cleaning method and system which is operative at various temperatures to accommodate different objects to be cleaned and different solvents.

It is a further object of this invention to provide such an improved closed circuit solvent cleaning method and system which is operative at various temperatures and pressures other than the boiling point at atmospheric pressure of the solvent used.

It is a further object of this invention provide such an improved closed circuit solvent cleaning method and system which dries the solvent off the object before venting to atmosphere.

It is a further object of this invention to provide such an improved closed circuit solvent cleaning method and system which more efficiently cleans by condensation of vapor on parts causing a vapor wash and cleaning.

It is a further object of this invention provide such an improved closed circuit solvent cleaning method and system which is much more efficient because heat is required for much less of the time during only the cleaning portion of the cycle.

It is a further object of this invention provide such an improved closed circuit solvent cleaning method and system which uses much less solvent.

It is a further object of this invention provide such an improved closed circuit solvent cleaning method and system which removes volatile contaminants prior to exposure to the solvent.

It is a further object of this invention provide such an improved closed circuit solvent cleaning method and system which employs internally generated differential pressures to drive the solvent through the system.

It is a further object of this invention provide such an improved closed circuit solvent cleaning method and system which is not restricted to operate with any particular solvent.

It is a further object of this invention provide such an improved closed circuit solvent cleaning method and system which virtually eliminates mixture of the solvent with air throughout the cleaning operation and eliminates the difficult step of separating the solvent from the air after the cleaning operation is completed.

The invention results from the realization that an efficient, economical, safe, environmentally sound solvent cleaning technique which is a truly closed operation can be effected, without the burden of having to separate the solvent from air after the cleaning operation, by evacuating a cleaning chamber containing parts to be cleaned before the solvent is introduced so that the solvent and air never meet, thus eliminating exposure to atmosphere. The airless solvent can then be easily extracted and condensed for reuse prior to the exposure of the chamber and parts to air during the removal of parts from the chamber after the cleaning operation has been completed.

This invention features and may suitably comprise, consist of, or consist essentially of a closed circuit solvent cleaning method comprising the steps of placing the object to be cleaned in a chamber and subjecting the chamber to a negative gauge pressure to remove air and other non-condensible gases. Following this, a solvent is introduced to the evacuated chamber and the object is cleaned. The solvent is then recovered from the object and chamber and the chamber is vented to atmosphere and the clean object is removed.

In a preferred embodiment the negative gauge pressure is in the range of atmospheric to zero atmospheric absolute. The solvent may be introduced in a vapor state or a liquid state, or both. The temperature of the chamber may be varied to control the temperature and vapor density of the solvent to increase or decrease the penetration of the solvent into the object to be cleaned and to create more or less pressure that can be used to drive the solvent through the closed system. Recovering the solvent includes withdrawing from the chamber the solvent in liquid state including the contaminants, and then drawing off from the chamber the solvent in the vapor state. Withdrawing the liquid solvent may include maintaining the chamber at an elevated temperature to generate increased pressure in the chamber and positively drive out the solvent in the liquid state with the contaminants. The drawing off of the solvent in the vapor state may include drying the object of solvent.

The invention also features apparatus for accomplishing the technique of the invention including a closed solvent cleaning system. There is a chamber for holding an object to be cleaned and means for applying a negative gauge pressure to the chamber to remove air and other non-condensible gases. There are also means for introducing to the chamber the solvent for cleaning the object and means for recovering the solvent from the object and chamber. Storage means stores the recovered solvent.

In a preferred embodiment, the chamber may include a heat exchanger for varying the temperature of the chamber. The means for applying a negative gauge pressure may include a vacuum pump and the means for introducing the solvent may include a valve means associated with the storage means. The means for recovering may include a drain for extracting the solvent liquid and contaminants and may include means for extracting the solvent vapor as well. The storage means may include one reservoir for receiving the solvent vapor and a second reservoir for receiving the solvent liquid, and there may be means for condensing the solvent vapor.

DISCLOSURE OF PREFERRED EMBODIMENT

Other objects, features and advantages will occur to those skilled in the art from the following description of a preferred embodiment and the accompanying drawings:

Figure 1:
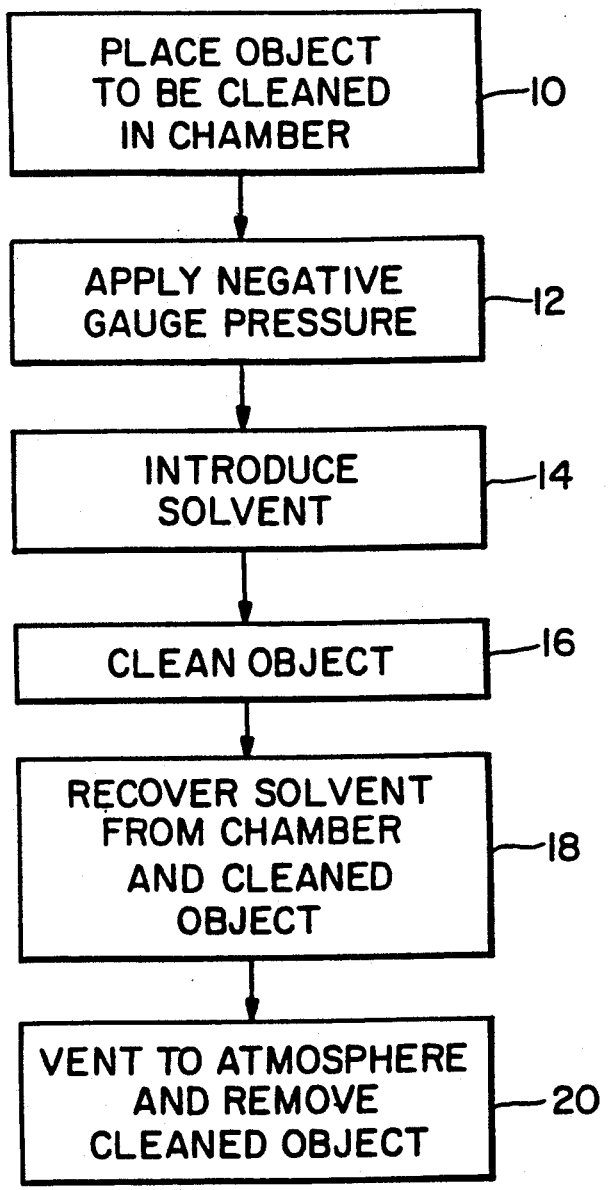
FIG. 1 is a flow chart of the improved closed circuit solvent cleaning method according to this invention.
Figure 2:
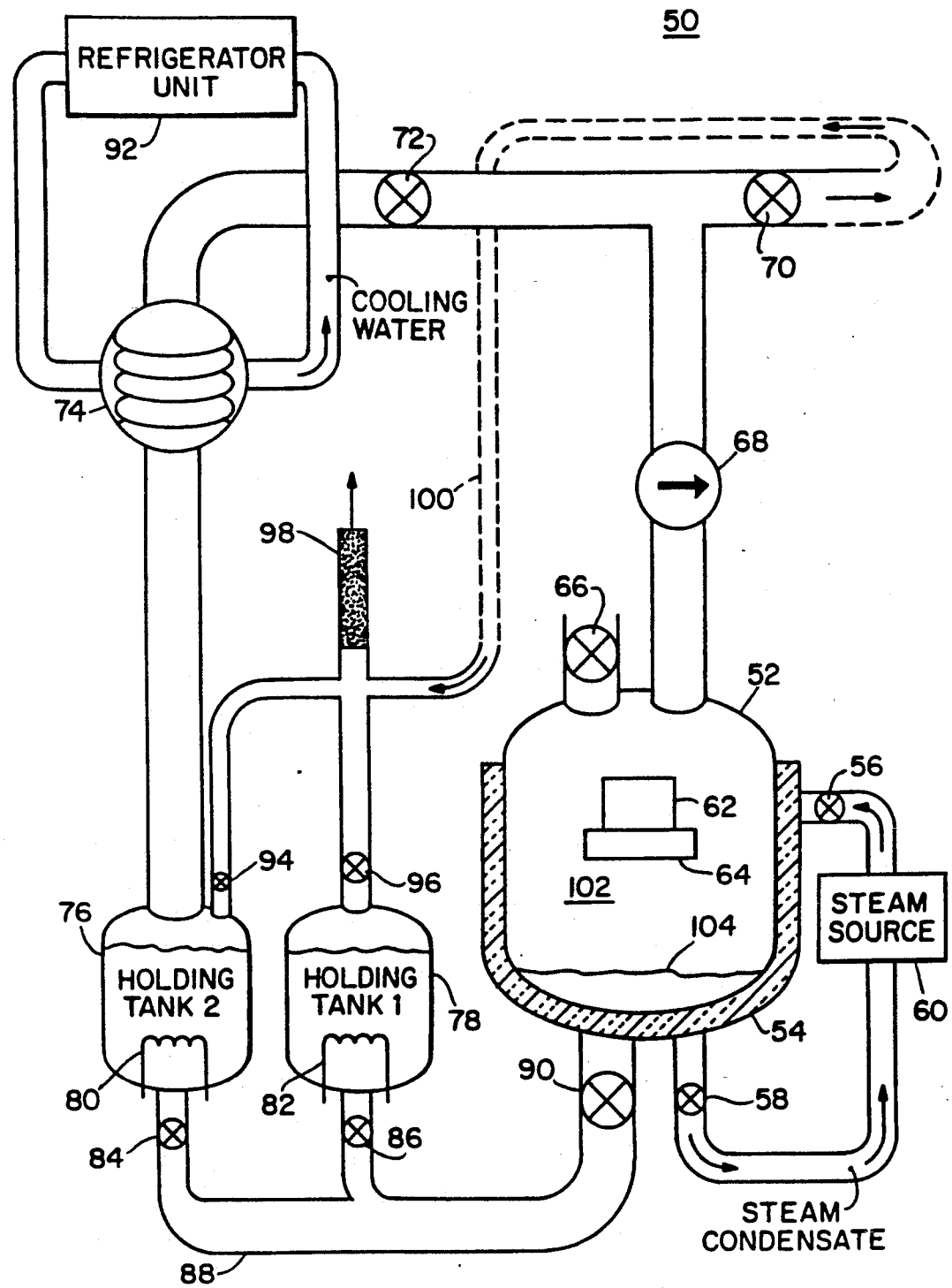
FIG. 2 is a schematic diagram of a closed circuit solvent cleaning system according to this invention.

The invention may be accomplished in a closed circuit solvent cleaning technique in which the object to be cleaned is placed in a chamber, and then subjecting the chamber to a negative gauge pressure in order to remove the air and other non-condensible gases from the chamber. Solvent cleaning as used herein includes vapor degreasing, clothing dry cleaning, and solvent immersion washing. In conventional solvent cleaning systems, most of the problems with the loss of expensive solvent result from the fact that the solvent vapors become mixed with air. The air then is either vented, requiring expensive and complex equipment for preventing environmental contamination, or the air with the vapor is put through a recovery process which can be equally expensive and complex, in order to recover the expensive solvent and cleanse the air before it is vented to atmosphere. This invention results from the realization that the entire problem can be eliminated or at least dramatically reduced by not allowing the solvent vapors to become mixed with air at all: to prevent any mixing at any time of the solvent with the air. This is done by evacuating the chamber of air and other non-condensible gases before any solvent is introduced so that the chamber contains only the object to be cleaned. The chamber is evacuated by employing a negative pressure which generally is less than the vapor pressure at the present operating temperature of the solvent and the contaminants to be removed such as water vapor and non-condensible gases. Sub-torr levels are not generally required. Torr levels of 0–700 torr are preferred. Ranges of 10–500 torr are workable and levels of 100 torr or less have had good results. After the solvent has been introduced and the part cleaned, the solvent is then recovered from the chamber and the object before the chamber is opened and vented to the atmosphere. Thus there is no contaminated air and the solvent may be recovered easily without the necessity to separate it from air. Depending on operating temperature, typically a negative gauge pressure in the range of atmospheric to slightly above zero atmospheric absolute is sufficient.

With the chamber evacuated, it is typically at a lower pressure than the solvent, which is stored in a holding tank. The opening of a valve then permits the solvent to flow or to flash in vapor form from the higher to the lower pressure in the chamber without requiring pumping equipment and the added expense of the energy required. Liquid as well as vapor phase solvent can be introduced to the chamber at this point. Once the solvent has been introduced into the chamber, the object is cleaned. Because of the control afforded by the closed operation of this invention, the solvent can be heated or cooled and/or the pressure can be increased or decreased to whatever levels are desirable for a particular cleaning task. For example, the pressure in the chamber can be increased above atmospheric to enhance cleaning efficiency or the temperature could be increased above the ambient temperature. Then before the object is removed or there is any venting to atmosphere, the solvent is returned to the storage tank and recovered. The liquid may be recovered first, as it typically will reside at the bottom of the tank and contain in it the contaminants that have been removed from the clean part. This liquid solvent can be drained by gravity back to the holding tank or the temperature of the chamber can be increased to increase the pressure in the chamber so that the liquid solvent can be driven back to the holding tank. Subsequent to this the vapor may be drawn off and fed back to a separate holding tank or a separate compartment of the original holding tank. Separation is desirable between the vapor recovery and the liquid recovery because the vapor in this case is effectively a distillation product and will remain quite clean compared to the liquid which contains the contaminants. The vapor may be condensed in its travel back to the holding tank. Following the removal of the solvent in all its phases, the chamber may be opened to atmosphere so that the parts can be removed. The vapor removal from the chamber is sufficiently thorough so that a drying of the parts occurs as well as the removal of the vapor from the chamber. A heat exchanger or similar device may be associated with the chamber in order to control the temperature of the cleaning process. Thus certain materials which cannot withstand elevated temperatures or perhaps even room temperatures during the cleaning process may be accommodated by simply cooling the chamber. The heat exchanger may also increase the temperature in the chamber to accomplish a number of different goals. Increased temperature increases the penetration of the vapor into the part to be cleaned and thus enhances the cleaning function. Increased temperature also increases the vapor pressure in the chamber which can be used to drive out the liquid and vapor solvents as indicated previously. The temperature or cooling that is applied to the chamber may be applied only during the cleaning cycle at a great saving of energy over those systems that have heat, for example, applied during the entire operation.

One of the advantages of such a system is that it can work with solvents in the vapor form, in the liquid form or both, and it can work with a variety of different solvents, e.g. 1.1.1. trichloroethane, trichloroethylene, methylene chloride, perchloroethylene, freon, aldehydes, alcohols, amines, ketones, aromatics, or other solvents which may or may not be heavier than air.

Such a system enables solvent recovery, which is increasingly important as solvent prices increase, and also limits hazard emissions, which is equally important as the regulations for emissions become more stringent and the cost of abiding by those regulations becomes more expensive.

Added features of this invention are that it uses much less solvent since the vapor is flashed into the cleaning chamber with at worst only a small amount of liquid; that is, the entire cleaning chamber or tank does not have to be filled as is often the case with open circuit systems.

Another important advantage of this technique is that the initial evacuation of the chamber after the parts are inserted for cleaning but before the solvent has been introduced, operates to remove volatile contaminants that may be associated with the parts even before the solvent is introduced.

There is shown in FIG. 1 a flow chart depicting an implementation of the method of this invention. The object to be cleaned, such as a piece of clothing or a manufactured part, is placed in the cleaning chamber in step 10. Then a negative gauge pressure is applied in step 12. This removes air and other non-condensible gases; it also removes any volatile contaminants. The atmosphere evacuated from the chamber at this point can be passed through suitable filters if this is necessary. The negative gauge pressure is typically between atmospheric and zero atmospheric absolute. Pressures in the range of 10 torr appear to be sufficient. Following this, the solvent is introduced in step 14. This can be done in vapor or liquid form, or both. Then the object is cleaned for an appropriate period of time. During this time, the temperature can be varied to favor the appropriate conditions for the material or object being cleaned and also to improve vapor density and penetration of the solvent into the object. The temperature increase or decrease is effected only during the cleaning operation so that there is a substantial saving in energy. There can also be a substantial saving in energy by the fact that an increased temperature of the chamber increases the differential pressure between the two chambers to the point where that differential pressure alone could be used to drive out the solvent after the cleaning operation is done. Typically, with the solvent being present partially as a liquid and partially as a vapor, the solvent is recovered in step 18 by first removing the liquid which contains the contaminants, and then removing the vapor which is virtually clean since it is a distillation product. A complete removal of the vapor at this point also effects a drying of the object, which further minimizes the contamination of the environment with solvents in vapor or liquid form that would ordinarily cling to the object. Finally, in step 20, the chamber is opened to atmosphere and the cleaned object is removed.

The system 50 for implementing the technique of this invention includes a cleaning or degreasing tank or chamber 52, which includes a heat exchanger 54. Valves 56 and 58 control the inlet and outflow, respectively, of the heating or cooling fluid. In this specific embodiment it is a heating fluid obtained from steam source 60. A part to be cleaned 62 may be placed on a suitable support 64 within chamber 52. Valve 66 operates to vent chamber 52 to the atmosphere. Pump 68 is used to apply the negative gauge pressure to chamber 52 when it is operating as a vacuum pump. It could also be operated as a positive pump if operation at pressures above atmospheric is desired. An activated charcoal filter may be added to absorb any residual solvent vapors before they enter the vacuum pump. Valve 70 operates to vent the outflow from vacuum pump 68 to atmosphere while valve 72, in a different portion of the cycle, directs the outflow from vacuum pump 68 back through condenser 74 to a holding tank 76. Holding tank 76 and holding tank 78 are each provided with heaters 80, 82, and communicate through valves 84 and 86, respectively, with conduit 88 that communicates through valve 90 with chamber 52. A refrigerator unit 92 is used to provide coolant to condenser 74. Valves 94 and 96 are used to purge air from holding tanks 76 and 78, respectively, and deliver it to a carbon filter or a similar filter 98 before it is vented to atmosphere. A third input to carbon filter 98 may be delivered through conduit 100 shown in phantom, which may be interconnected with valve 70 so that the outflow from vacuum pump 68 upon the evacuation of chamber 52 can be filtered first through carbon filter 98 before it is vented to atmosphere. This is especially important if there are volatile toxic contaminants associated with the parts that can be drawn off by the initial evacuation of chamber 52.

In operation, with the solvent stored in first holding tank 78, heater 82 may be activated to increase the temperature of the solvent such as tetrachloroethylene to 100° C., producing a 400 torr vapor pressure. Valve 66 is then opened, venting chamber 52 to atmosphere, part 62 is placed on support 64 in chamber 52, valve 66 is closed and vacuum pump 68 is operated. All of the air and non-condensible gases and any volatile contaminants are drawn off by vacuum pump 68 and are directed by closed valve 72 and open valve 70 directly to atmosphere or, alternatively, through conduit 100 and carbon filter 98, and then to atmosphere. Vacuum pump 68 is then shut off. Since the tetrachloroethylene solvent in the first holding tank 78 is at 100° C., with a 400 torr vapor pressure, when valve 86 is opened, the vapor flashes through conduit 88 and open valve 90 into chamber 52, so that the vapor 102 fills chamber 52, condenses on and cleans part 62. If desired, the small amount of liquid solvent 104 may also be introduced. Valves 86 and 90 are closed. Valves 56 and 58 may now be opened and steam source 60 activated to increase the temperature of chamber 52 to approximately 121° C., providing a 760 torr or 1 atmosphere pressure in the chamber during cleaning. After the cleaning cycle has been completed, the steam source 60 may be shut down and valves 56 and 58 closed. Valve 90 may be periodically opened to allow the liquid solvent 104 to gravity drain back through conduit 88 and open valve 86 to holding tank 78. Or more typically, the increased pressure of 760 torr will drive the liquid with its contaminants back into the holding tank 78. The pressure in chamber 52 now drops to about 400 torr. Following this, vacuum pump 68 may be operated with valve 70 closed and valve 72 open. This draws off the vapors 102 in tank 52 including the vapors associated with object 62 so that it is dried during this process. The vapor, being virtually pure, is condensed in condenser 74 and delivered back to the second holding tank 76, which stores only clean solvent which may be used when the solvent in holding tank 78 becomes contaminated and must be removed and processed. Periodic purging of the air in tanks 76 and 78 is accomplished through valves 94 and 96. Finally, vacuum pump 68 is stopped and valve 66 is opened to vent chamber 52 to atmosphere and part 62 is removed, having been dried and cleaned without introducing any hazardous waste to the atmosphere. Simultaneously, the solvent has been fully recovered with a minimum of effort and expense since it was not mixed with air and there is no need to undertake the expensive an complex procedures required to separate solvent from air and clean the air of the solvent contaminants.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A closed circuit solvent cleaning method comprising the steps of:
    placing the object to be cleaned in a chamber;
    subjecting the chamber to a negative gauge pressure to remove air and other non-condensible gases;
    introducing a solvent to the evacuated chamber;
    cleaning the object while maintaining an airless environment within the chamber;
    recovering and processing the solvent from the object and chamber within the closed circuit for preventing emissions to the environment; and
    removing the cleaned object.

2. The closed circuit solvent cleaning method of claim 1 in which said negative gauge pressure is below the vapor pressure of the solvent and the contaminants to be removed.

3. The closed circuit solvent cleaning method of claim 1 in which said negative gauge pressure is in the range of atmospheric to zero atmospheric absolute.

4. The closed circuit solvent cleaning method of claim 3 in which said negative gauge pressure is in the range of 0–700 torr.

5. The closed circuit solvent cleaning method of claim 4 in which said negative gauge pressure is in the range of 10–500 torr.

6. The closed circuit solvent cleaning method of claim 5 in which said negative gauge pressure is in the range of 100 torr or less.

7. The closed circuit solvent cleaning method of claim 1 in which said solvent is introduced to said chamber in the vapor state.

8. The closed circuit solvent cleaning method of claim 1 in which said solvent is introduced to said chamber in the liquid state.

9. The closed circuit solvent cleaning method of claim 1 further including varying the temperature of the chamber to control the temperature and vapor pressure of the solvent.

10. The closed circuit solvent cleaning method of claim 9 in which varying the temperature of the chamber includes increasing the temperature to increase the pressure of the solvent to increase its penetration into the object to be cleaned.

11. The closed circuit solvent cleaning method of claim 9 in which varying the temperature of the chamber is effected only during the cleaning of the object.

12. The closed circuit solvent cleaning method of claim 1 in which recovering the solvent includes withdrawing from the chamber the solvent in liquid state including contaminants, and then drawing off from the chamber the solvent in the vapor state.

13. The closed circuit solvent cleaning method of claim 12 in which withdrawing the liquid solvent includes maintaining the chamber at an elevated temperature to generate increased pressure in the chamber to positively drive out the solvent in the liquid state with contaminants.

14. The closed circuit solvent cleaning method of claim 12 in which drawing off the solvent in the vapor state includes drying the object of solvent.

15. The method of claim 1 further including preheating the solvent before introduction into the chamber.

16. The method of claim 1 further including storing the solvent to be introduced in a reservoir.

17. The method of claim 16 further including producing a subatmospheric vapor pressure in said reservoir.

18. The method of claim 1 in which cleaning the object further includes increasing the temperature of the chamber during cleaning.

19. The method of claim 1 in which cleaning the object further includes increasing the pressure within the chamber during cleaning.

20. A method of cleaning objects in a closed circuit solvent cleaning system including a solvent supply system in sealable communication with a cleaning chamber comprising:

sealing said solvent supply system with respect to said chamber;

opening said chamber to the atmosphere and placing an object to be cleaned in said chamber;

evacuating said chamber to remove air and other non-condensable gases;

sealing said chamber with respect to the atmosphere;

opening said chamber with respect to said solvent supply system and introducing a solvent into the evacuated chamber;

cleaning the object while maintaining an airless environment within the chamber;

recovering and processing the solvent introduced into the chamber within the closed circuit solvent cleaning system;

sealing said chamber with respect to said solvent supply system; and opening said chamber and removing the cleaned object.

* * * * *